(12) United States Patent
Poiret et al.

(10) Patent No.: US 6,652,402 B2
(45) Date of Patent: Nov. 25, 2003

(54) CHAIN DRIVE

(75) Inventors: Christian Poiret, Coulogne (FR); Alexandre Charton, Calais (FR)

(73) Assignee: Renold, PLC, Manchester (GB)

( * ) Notice: Subject to any disclaimer, the term of this patent is extended or adjusted under 35 U.S.C. 154(b) by 0 days.

(21) Appl. No.: 09/943,542

(22) Filed: Aug. 30, 2001

(65) Prior Publication Data

US 2002/0183150 A1 Dec. 5, 2002

(30) Foreign Application Priority Data

Sep. 2, 2000 (GB) .............................. 0021749
Jun. 14, 2001 (GB) .............................. 0114493

(51) Int. Cl.$^7$ ................................ F16H 7/06
(52) U.S. Cl. ...................... 474/156; 474/210
(58) Field of Search ................ 474/153, 155, 474/206, 210, 232, 236, 148, 156, 157

(56) References Cited

U.S. PATENT DOCUMENTS

| | | | | |
|---|---|---|---|---|
| 2,199,292 A | * | 4/1940 | Pierce | ........................ 474/156 |
| 3,644,871 A | | 2/1972 | Lafont | |
| RE34,688 E | * | 8/1994 | Lapeyre | ........................ 198/834 |
| 5,980,408 A | * | 11/1999 | Schulz | ........................ 474/161 |
| 6,179,741 B1 | * | 1/2001 | Young | ........................ 474/161 |

OTHER PUBLICATIONS

*International Search Report*, PCT/GB 00/00312, 3 pages (May 15, 2000).

* cited by examiner

*Primary Examiner*—Thomas R. Hannon
*Assistant Examiner*—Vicky A. Johnson
(74) *Attorney, Agent, or Firm*—Akin Gump Strauss Hauer & Feld

(57) ABSTRACT

A chain drive comprises a chain having a plurality of articulating chain links and a toothed sprocket. The sprocket and the chain links have bearing surfaces that contact one another during meshing of the chain. The surfaces are disposed along the length of the chain between the apertures and to one side of a sprocket tooth. One of the bearing surfaces is arcuate so that during meshing of said chain link the bearing surfaces are brought into contact such that the instantaneous centre of rotation of the meshing chain link passes from the first pivot pin of a link to the point of contact of the bearing surfaces before passing to the second pivot pin of the link. This reduces the noise generated by collision of the chain links and the sprocket teeth.

11 Claims, 5 Drawing Sheets

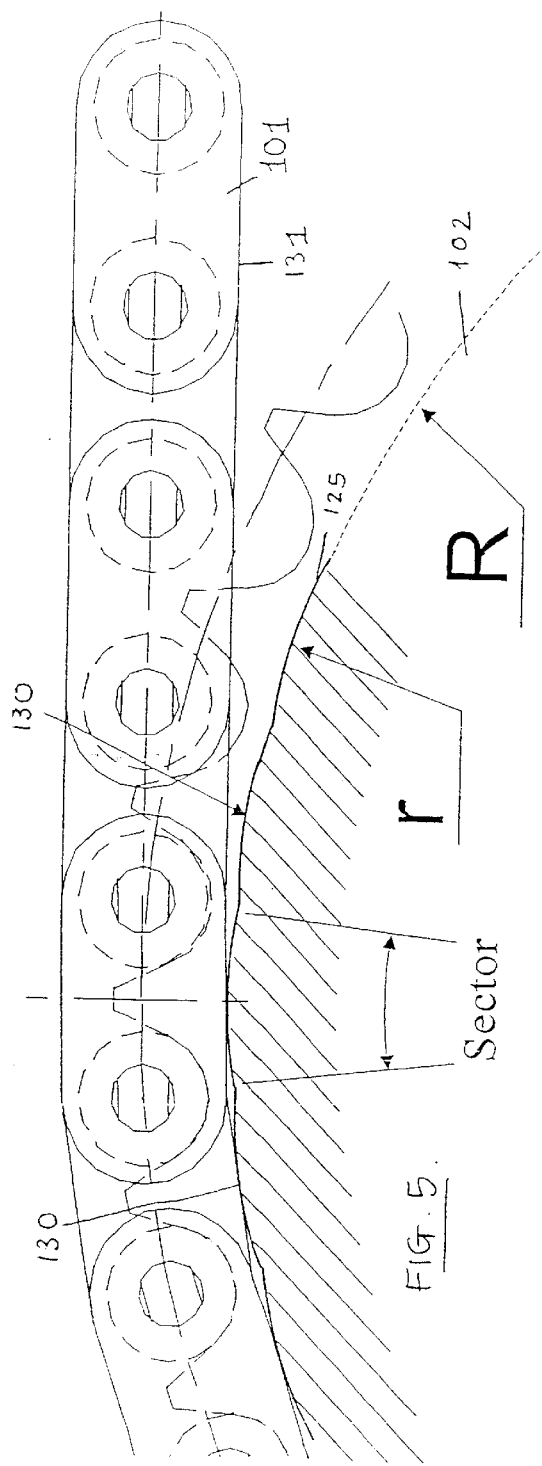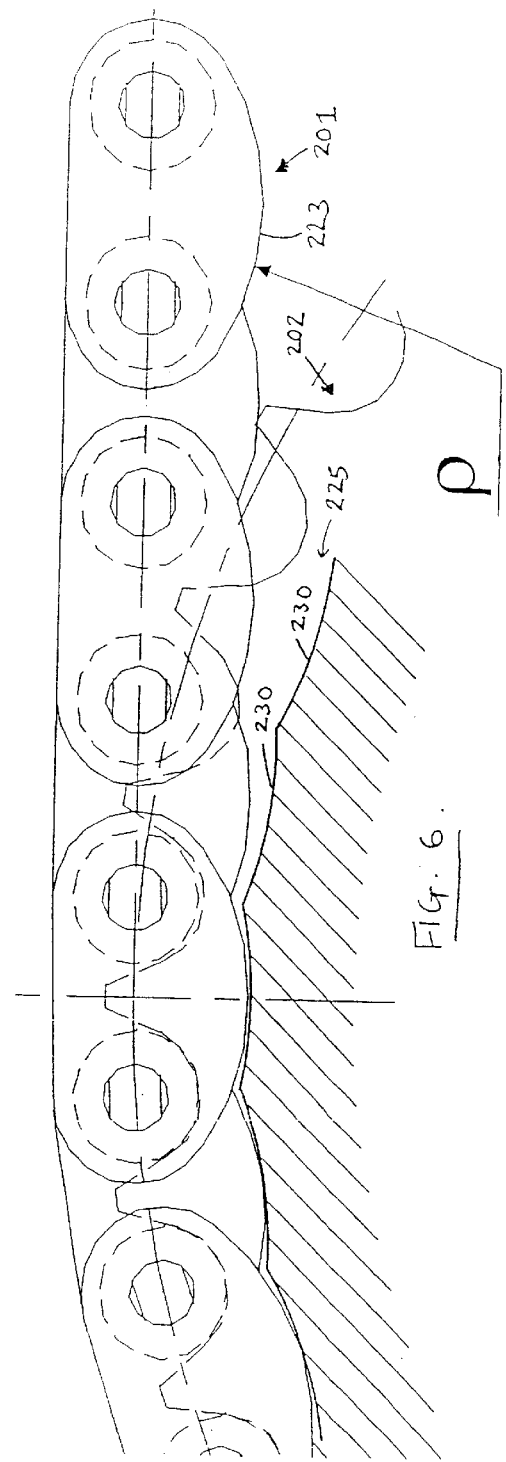

CHAIN DRIVE

CROSS-REFERENCE TO RELATED APPLICATIONS

This application claims priority under 35 U.S.C. §119 to Great Britain Patent Application No. 0021749.7 filed Sep. 2, 2000, and Great Britain Patent Application No. 0114493.0 filed Jun. 14, 2001.

STATEMENTS REGARDING FEDERALLY SPONSORED RESEARCH OR DEVELOPMENT

Not applicable.

REFERENCE TO A MICROFICHE APPENDIX

Not Applicable.

BACKGROUND OF THE INVENTION

1. Field of the Invention

The present invention relates to a chain drive of the kind comprising a chain that meshes with a sprocket, and particularly but not exclusively to a chain drive designed to reduce undesirable noise generated during meshing.

2. Description of the Related Art

A chain drive typically comprises at least two toothed sprockets and a chain comprising links that are pivotally connected to one another by pivot pins. The chain engages the teeth on the periphery of each sprocket and rotation of one sprocket is transmitted to the other via the chain. When the chain meshes with the sprockets, undesirable noise is generated as a result of the collision of the chain with the sprocket and the resultant vibration of the chain and sprocket.

The collision between the chain and sprocket happens rapidly during meshing as a result of what is known as "chordal action" or the "chordal effect". These terms are used to describe the uncontrolled and rapid movement of the chain links relative to the sprocket teeth during meshing and unmeshing. The movement arises from the fact that the pitch line of the chain comprises a plurality of straight lines or chords that combine to form part of a polygon rather than a circle (as would be the case for a flexible belt). The rapid and uncontrolled movement of the chain links results in them impacting on the sprocket with a high velocity thereby generating noise.

Many attempts have been made to reduce the noise in a chain drive. For example, U.S. Pat. No. 5,127,884 describes a chain drive comprising a chain having hinged joints each equipped with a torsional spring and a sprocket with cam manipulated teeth. The hinged joints and torsional springs are designed to resist hinging of the links and therefore prevent the links falling freely on to the sprocket. This reduces the impact velocity and associated noise attributable to the chordal effect. In order to reduce the noise further, support pads are also provided on the sprocket to prevent sliding of the chain links. The provision of the torsional spring at each joint significantly increases the cost of the chain.

U.S. Pat. No. 4,261,214 discloses a sprocket equipped with a cushion ring having a larger diameter than the nominal sprocket diameter. The cushion ring cushions the fall of the chain links on to the sprocket in order to reduce the noise generated by the chain. However, such rings have a tendency to wear during use and require regular replacement. Similarly, U.S. Pat. No. 5,360,378 describes the use of rubber rings on the face of the sprocket, although the chain links do not come into contact with the rings. Noise reduction is stated to be achieved by the absorption of sprocket vibration by the rubber rings.

U.S. Pat. No. 4,650,445 describes a chain having links with longitudinally spaced apertures that are offset with respect to one another to vary the timing between the links falling onto the sprocket. The links pivot about a pair of pins that are located in the apertures and have adjacent rocking surfaces to form the pivot point. The chordal action is varied between links so that the resulting noise pattern is irregular and hence is less objectionable to the human ear.

DE-A-19543287 describes a chain drive that seeks to avoid "flank shock" that occurs as a result of the chordal action. The sprocket wheel is designed to allow tangential guidance of the chain as it meshes. This is provided for by resilient support rings or spring-loaded support rams on both sides of the sprocket teeth. These additional components provide for added complexity and increase the manufacturing costs. In the case of the spring-loaded support rams the point of contact of a chain link with the ram during meshing moves so that its distance from the pivot axis of the pin increases. At the same time a progressively increasing torque is applied by the ram to the chain plate.

Although there are many attempts in the prior art to reduce the noise generated by chordal action, none of these has been entirely successful. It is an object of the present invention to provide an improved chain drive which reduces unwanted noise generated by the chordal action.

BRIEF SUMMARY OF THE INVENTION

According to a first aspect of the present invention there is provided a chain drive comprising a chain having a plurality of chain links, each chain link having two apertures spaced apart along the length of the chain, each chain link being connected to adjacent links by first and second pivot pins that pass through said apertures such that the links articulate relative to one another about the pins, and a sprocket having a plurality of peripheral teeth that mesh with the chain, wherein the sprocket and at least one chain link each have a bearing surface, at least one of the bearing surfaces being arcuate such that during meshing of said chain link the bearing surfaces are brought into contact so that the instantaneous center of rotation of the meshing chain link passes from the first pivot pin of the link to the point of contact of the bearing surfaces before passing to the second pivot pin of the link and a resulting rocking movement of the chain link relative to the sprocket is thereby supported.

As the meshing link is supported at the bearing surfaces by virtue of the rolling contact between the two, its motion is controlled and the velocity of impact with the sprocket is reduced.

It has been found that with prior art chains, the chordal action can be attributed to the instantaneous center of rotation (hereinafter "ICR") of a chain link changing abruptly from one pivot pin axis to another during meshing with the sprocket. The movement of the chain link is uncontrolled and rapid and results in high velocity impact with the sprocket thereby generating undesirable noise. When a chain link and sprocket are provided with bearing surfaces (at least one of which is arcuate) that bear against each other during meshing such that there is a moving point of contact, the ICR moves smoothly from one pin of the link to the other via the point of contact between the bearing surfaces, thus reducing the impact velocity of the pivot pin (or more typically of a roller provided around the pivot pin) with the sprocket. This reduces the amount of noise generated.

The bearing surface of the sprocket is ideally fixed in a radial direction and/or substantially incompressible.

The arcuate bearing surface may be provided on the chain link at a position along its length between the first and second pivot pin so that during meshing there is a moving point of contact between the two bearing surfaces in the region between the two pivot pins. Alternatively the arcuate bearing surface may be provided on the sprocket to one side of the tooth such that during meshing the bearing surface on the chain link is in moving contact therewith.

Preferably, the bearing surface on the chain link is provided by a convex arcuate profile defined on a bottom flank of a link plate of the chain link.

In a preferred embodiment the teeth of the sprocket are configured to allow the longitudinal axis of one of the pins to move below the pitch diameter of the sprocket. A root between adjacent teeth of the sprocket is ideally undercut to allow the longitudinal axis of the pin to move below the pitch diameter of the sprocket.

Preferably, the teeth each have a flank with a middle section that is substantially parallel to the diameter of the sprocket and is designed to contact a roller of the chain link during meshing. The roller of the chain link slides down the middle section of a tooth flank during meshing. The bearing surface and the teeth are configured so as to ensure that the bearing surfaces are brought into contact before the roller contacts teeth, thus allowing the chain link to rock about the bearing surface contact point before a second roller of the chain link is brought into contact with the next teeth on the sprocket.

BRIEF DESCRIPTION OF THE SEVERAL VIEWS OF THE DRAWINGS

Specific embodiments of the present invention will now be described by way of example with reference to the accompanying drawings, in which:

FIG. 5 is a partial side view in part cross-section of a first alternative embodiment of the chain and sprocket of the present invention;

FIG. 6 is a partial side view in part cross-section of a second alternative embodiment of the present invention;

DETAILED DESCRIPTION OF THE INVENTION

Figure 1:
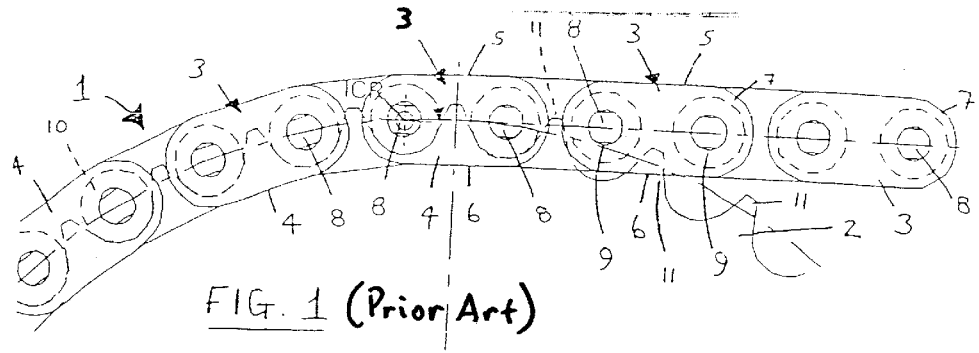
FIG. 1 is a partial side view in part cross-section of a prior art chain in position on a sprocket.

Referring first to FIG. 1 of the accompanying drawings, there is illustrated a conventional roller chain 1 in position on a sprocket 2. The chain comprises a plurality of interconnected, articulating links 3. Each link 3 comprises opposed link plates 4 that have substantially flat top and bottom flanks 5, 6 and rounded ends 7. The links 3 are joined to one another by means of transverse pivot pins 8 that extend through apertures 9 in overlapping ends of the adjacent link plates 4. Each of the pivot pins 8 supports a rotary roller 10 between the plates.

The chain passes over at least two sprockets (part of one sprocket 2 only being shown) and meshes with peripheral teeth 11 of the sprocket 2 so that rotational motion of one sprocket (the drive sprocket) is transmitted to the other sprocket (the driven sprocket) via the chain. The teeth 11 of each sprocket 2 mesh with the chain 1 between adjacent rollers 10.

In this prior art chain, the instantaneous centre of rotation ICR of a meshing link passes abruptly from a first pivot pin of the link to the second pin and, as described above, the chain link collides with the sprocket with high impact velocity thereby generating noise.

Figure 2:
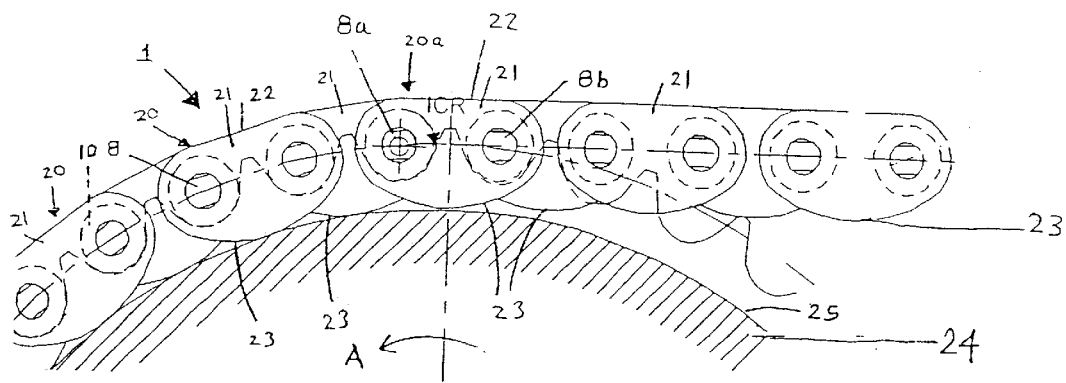
FIG. 2 is a partial side view in part cross-section of a chain according to the present invention in position on a sprocket.
Figure 3:
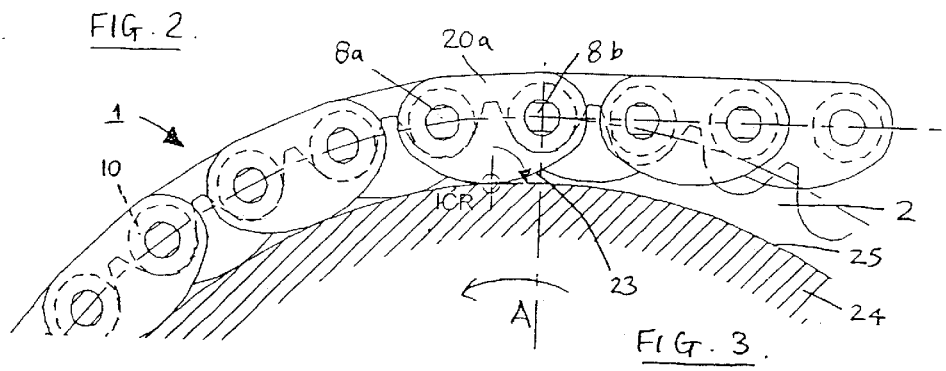
FIG. 3 shows the chain and sprocket of FIG. 2 with the sprocket rotated slightly in an anticlockwise direction.
Figure 4:
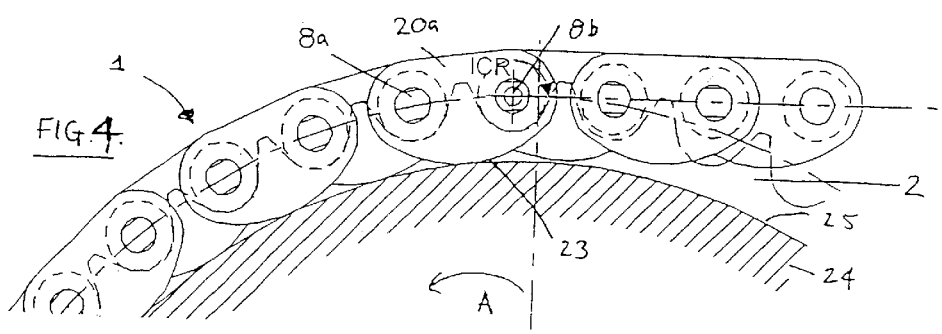
FIG. 4 shows the chain and sprocket of FIG. 3 with the sprocket rotated slightly further in an anticlockwise direction.

Referring now to FIGS. 2 to 4 of the accompanying drawings, there is illustrated a chain drive according to the present invention. Parts corresponding to those of FIG. 1 have like reference numerals, and will not be described further except insofar as they differ from their counterparts of FIG. 1.

The chain 1 is comprised of links 20, the link plates 21 of which have an upper flat flank 22 and a bottom flank that defines a convex arcuate bearing edge 23 having a radius of curvature less than the radius of the sprocket. The chain 1 is arranged so that the arcuate bearing edges 23 all face in the same direction, that is, radially inwardly towards the sprocket 2. The sprocket 2 has a circular bearing ring 24 disposed on one side thereof, the upper surface of the ring defining a bearing surface 25. When the chain links 20 are meshed with the sprocket teeth 10 the bearing edge 23 of the link plates 21 are in contact with the bearing surface 25 of the sprocket 2.

As the sprocket 5 is rotated in the direction of arrow A, a leading end chain link 20a is brought into meshing engagement with the sprocket 2. During this time the convex arcuate bearing edge 23 of the link plate 20a engages the bearing surface 26 of the sprocket bearing ring 24. Instead of abruptly passing from one pivot pin 8 to the next, the instantaneous centre of rotation passes from the first pin 8a (see FIG. 2) of the meshing link 20a to the point of bearing contact between the bearing edge 23 and the bearing surface 25 of sprocket 2 (FIG. 3) before passing to the second pivot pin 8b (FIG. 4). As the chain link meshes the bearing edge 23 rolls or rocks over the bearing surface 25 so that the point of contact (and therefore the ICR) progresses continuously along the link plate 20a. The articulating movement of the chain link 20a during meshing with the sprocket 2 is thus supported and controlled by virtue of the rolling bearing contact. The trailing end of the meshing link and the subsequent links in the chain approach the sprocket with reduced velocity so that the impact force of the links 20 with the sprocket 2, and therefore the associated noise, is thereby reduced.

Although a bearing edge 23 is shown in the accompanying drawings on each chain link plate 21, it could be provided only on alternate links or on only some of the links, which would still provide some reduction in noise.

The embodiment of FIG. 5 shows an alternative embodiment of the chain drive of the present invention in which a plurality of convex arcuate formations 130 are defined around the circumference of the bearing surface 125 of the sprocket 102 rather than on the chain 101 which in this case has a flat profile 131 at its bearing surface. Each arcuate formation is a sector of a circle having a radius r that is less than the nominal radius R of the sprocket. Again each chain link undergoes a supported rocking movement during meshing by virtue of its contact with the bearing surface 125.

An alternative embodiment of the chain drive is illustrated in FIG. 6. The chain 201 is of the same configuration as that of FIGS. 2 to 4 but the sprocket 202 has a plurality of concave arcuate formations 230 disposed around the circumference of the bearing surface 225 of the sprocket 202. The radius of curvature r of each bearing surface 225 is greater than the radius of curvature p of the convex bearing surface 223 of the plates.

Figure 7:
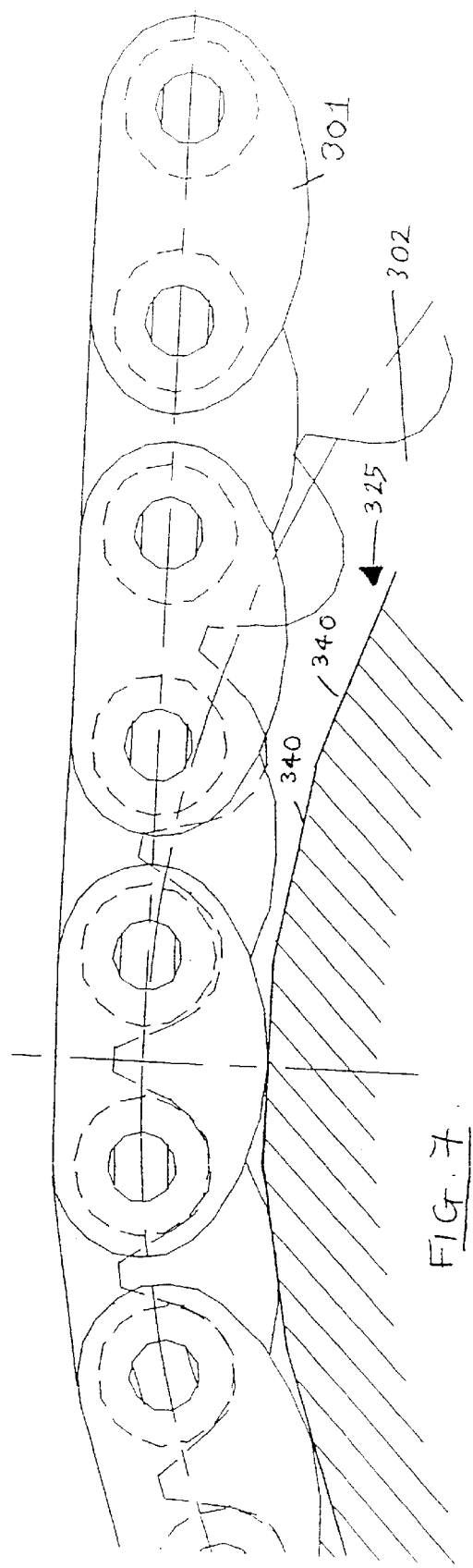
FIG. 7 is a partial side view in part cross-section of a third alternative embodiment of the present invention.

In the alternative embodiment illustrated in FIG. 7 the bearing surface 325 of the sprocket 302 comprises a plurality of flat edges 340. The chain 301 profile is the same as that of FIGS. 2 to 4.

Figure 8:
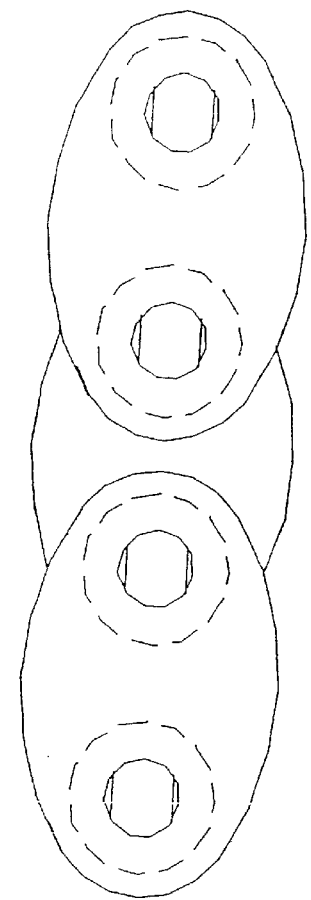
FIG. 8 is a side view of part of an alternative chain embodiment forming part of the present invention.

The bearing edges could be provided on both edges of the chain links rather than on one edge only, as shown in the embodiment of the chain illustrated in FIG. 8. This design allows the chain to mesh with the sprocket in two orientations The radius of curvature of the bearing surface on the chain plate in any of the embodiments of FIGS. 2 to 4 or 6 to 8 may be greater than equal to or less than the radius of curvature of the overall sprocket. The important feature is that there is constant supporting contact between the bearing surfaces defined on the chain plate and on the sprocket.

It should also be appreciated that, although an arcuate bearing edge on the chain or sprocket is preferred, other shapes could be employed, provided that any part of the bearing edge of the chain link or the bearing surface of the sprocket is arcuate. The bearing profiles may be involute, parabolic, elliptical or curved in any other way.

Figure 9:
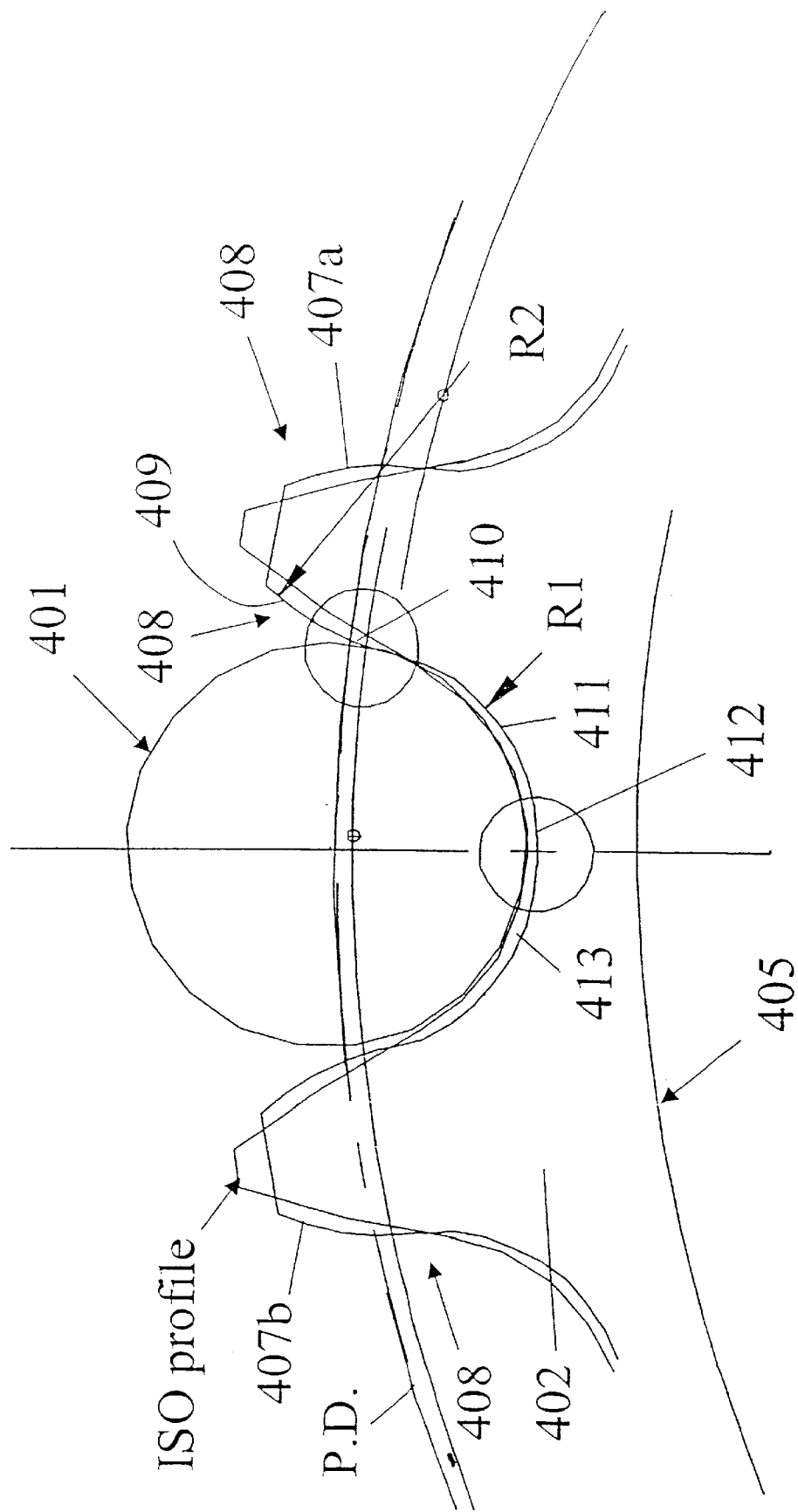
FIG. 9 is a side view of part of a sprocket and a chain roller of a fourth alternative embodiment of the chain and sprocket of the present invention.
Figure 10:
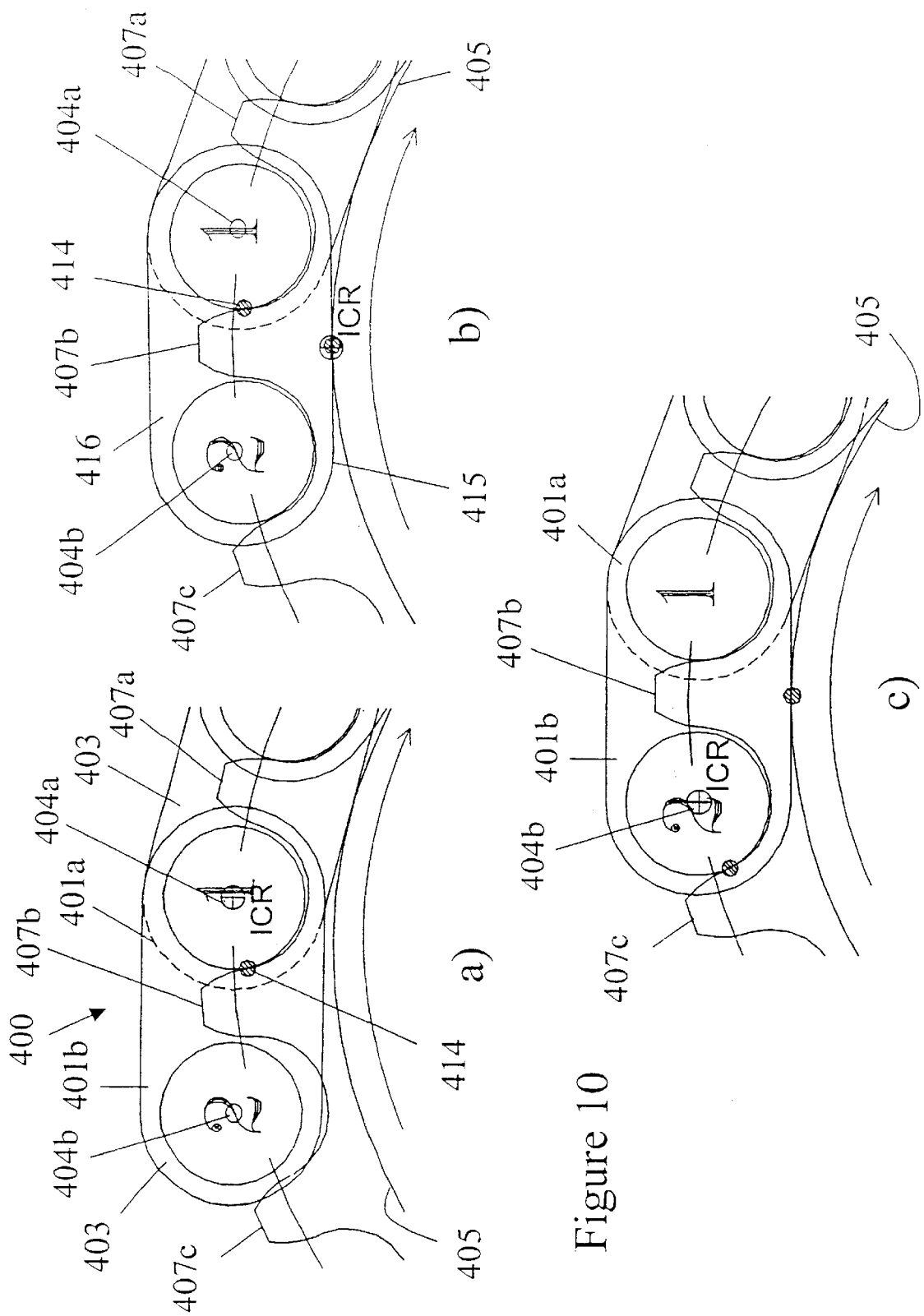
FIGS. 10a, b and c are a side view of part of the chain and sprocket embodiment of FIG. 9, illustrating the sequence of steps in which the chain, meshes with the sprocket.

FIGS. 9 and 10 show an alternative embodiment of the present invention where the links of the chain are not arcuate and the bearing ring of the sprocket does not have a plurality of arcuate formations. The chain 400 (only a single roller 401 shown in FIG. 9) is a conventional roller bush chain of the kind illustrated in FIG. 1. However, the sprocket 402 is provided with a novel tooth profile that ensures the meshing of each chain link 403 is supported such that its ICR passes from the first pivot pin 404a to a point of contact with a bearing surface 405 of the sprocket before passing to the second pivot pin 404b of the link 403. For the purposes of comparison, profiles of the sprocket teeth 407 are shown against the profiles of the teeth of an ISO (International Standards Organisation) sprocket.

Each tooth 407 is shorter than that of an ISO sprocket tooth and has identical flanks 408 that are relatively steep compared to those of an ISO sprocket. The teeth flanks 408 comprise an upper section 409 of radius R2, a middle section 410 in which the surface extends substantially parallel to the radius of the sprocket and a lower section 411 of radius R1. In between adjacent pairs of teeth 407 there is a root section 412 that is undercut (indicated by reference numeral 413) in comparison with the root of an ISO sprocket.

The first stage in the meshing process is shown in FIG. 10a. The first roller 401a of the chain link 403 is received between adjacent teeth 407a, 407b, and moves into contact (indicated by reference numeral 414) with the middle section 410 of the flank of tooth 407b (or a low part of the upper section 409, or an upper part of the lower section 411). The instantaneous center of rotation ICR of the link 403 is initially coincident with the axis of the first pin 404a. A bottom edge 415 of the outer link plate 416 then moves unto contact with the bearing surface 405 of the sprocket 402 (FIG. 10b) and the chain link begins to rock about the contact point. During the rocking movement the first roller 401a momentarily slides down the tooth flank 408 such that the longitudinal axis of the first pin 404a momentarily falls below the pitch diameter (represented by line PD) of the sprocket 402. This movement is accommodated by the undercut 413 at the root 412. The second roller 401b, disposed coaxially about the second pin 404b, is at this stage free of the sprocket. Thus the ICR has moved from the axis of the first pin 404a to the point of contact of the link plate 416 with the bearing surface 405. This rocking movement is supported and guided by the interaction of the teeth 407a,b with the chain link rollers 401a,b. As the link rocks further the first roller 401a slides momentarily up the flank 408 of the tooth 407b so that the first pin axis again lies on the pitch diameter PD. The link 403 is then fully engaged (FIG. 10c). As the first roller 401a moves up the tooth 407b the second roller 401b moves into contact with and slides down the flank of the next tooth 407c and at the same time the ICR moves to the longitudinal axis of second pill 404b. The process is then repeated for the next chain link.

It is to be understood that the particular shape of the undercut may be of any convenient profile provided it allows the axis of the pin to drop under the pitch diameter of the sprocket momentarily during meshing. This movement of the first pin axis allows the bottom edge 415 of the link plate 416 to come into contact with the bearing surface 405 of the sprocket so as to establish a new ICR position and the rocking movement of the link can then commence before the second roller 401b comes into contact with the sprocket teeth 407b,c.

It is to be appreciated that in all embodiments of the present invention one or both of the opposed link plates of a single meshing chain link may contact the bearing surface on the sprocket. Moreover, the contacting link plate may be an inner plate, an outer link plate or both. As mentioned above it may not be necessary for all the links of a chain to mesh in the manner described above. In some applications it may be sufficient for only selected links (e.g. alternate) to mesh in this way. Finally, it is to be appreciated that the invention has application to a both drive or a driven sprocket.

What is claimed is:

1. A chain drive comprising a chain having a plurality of chain links, each chain link having two apertures spaced wart alone the length of the chain, each chain link being connected to adjacent links by first and second pivot puts that pass through said apertures such that the links articulate relative to one another about the pins, and a sprocket having a plurality of peripheral teeth that mesh with the chain, the sprocket and at least one chain link each having a bearing surface, the bearing surface of the sprocket being axially lateral to the sprocket teeth and being substantially incompressible, characterized in that at least one of the bearing surfaces is arcuate such that during meshing of said chain link the bearing surfaces are brought into contact so that the instantaneous center of rotation of the meshing chain link passes from the first pivot pin of the link to the point of contact of the bearing surfaces before passing to the second pivot pin of the link and a resulting rocking movement of the chain link relative to the sprocket is thereby supported, wherein the arcuate bearing surface is provided on the chain link at a position along its length between the first and second pivot pins so that during meshing the point of contact between the two bearing surfaces moves in the region between the two pivot pins.

2. A chain drive according to claim 1, wherein the bearing surface on the chain link is provided by a convex arcuate profile defined on a bottom flank of a link plate of the chain link.

3. A chain drive comprising a chain having a plurality of chain links, each chain link having two apertures spaced apart along the length of the chain, each chain link being connected to adjacent links by first, and second pivot pins that pass through said apertures such that the links articulate relative to one another about the pins, and a sprocket having a plurality of peripheral teeth that mesh with the chain, the sprocket and at least one chain link each having a bearing surface, the bearing surface of the sprocket being axially lateral to the sprocket teeth and being substantially incompressible, characterized in that at least one of the bearing surfaces is arcuate such that during meshing of said chain link the bearing surfaces are brought into contact so that the instantaneous center of rotation of the meshing chain link passes from the first pivot pin of the link to the point of contact of the bearing surfaces before passing to the second pivot pin of the link and a resulting rocking movement of the chain link relative to the sprocket is thereby supported, wherein the teeth of the sprocket are configured to allow the longitudinal axis of one of the pins to move below the pitch diameter of the sprocket.

4. A chain drive according to claim 3, wherein a root between adjacent teeth of the sprocket is undercut to allow the longitudinal axis of the pin to move below the pitch diameter of the sprocket.

5. A chain drive according to claim 4, wherein the teeth each have a flank with a middle section that is substantially parallel to the diameter of the sprocket and is designed to contact a roller of the chain link during meshing.

6. A chain drive according to claim 5, wherein the roller of the chain link slides down the middle section of a tooth flank during meshing.

7. A chain drive according to claim 6, wherein the bearing surface and the teeth are configured so as to ensure that the bearing surfaces are brought into contact before the roller contacts teeth.

8. A chain drive according to claim 3, wherein the teeth each have a flank with a middle section that is substantially parallel to the diameter of the sprocket and is designed to contact a roller of the chain link during meshing.

9. A chain drive according to claim 8, wherein the roller of the chain link slides down the middle section of a tooth flank during meshing.

10. A chain drive according to claim 9, wherein the bearing surface and the teeth are configured so as to ensure that the bearing surfaces are brought into contact before the roller contacts teeth.

11. A chain drive according to claim 8, wherein the bearing surface and the teeth are configured so as to ensure that the bearing surfaces are brought into contact before the roller contacts teeth.

* * * * *